United States Patent
Lange et al.

(10) Patent No.: US 12,067,040 B2
(45) Date of Patent: *Aug. 20, 2024

(54) DETERMINING RESPONSIVE CONTENT FOR A COMPOUND QUERY BASED ON A SET OF GENERATED SUB-QUERIES

(71) Applicant: Google LLC, Mountain View, CA (US)

(72) Inventors: Joseph Lange, Zurich (CH); Mugurel Ionut Andreica, Adliswil (CH); Marcin Nowak-Przygodzki, Bäch (CH)

(73) Assignee: GOOGLE LLC, Mountain View, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/103,291

(22) Filed: Jan. 30, 2023

(65) Prior Publication Data

US 2023/0169102 A1  Jun. 1, 2023

Related U.S. Application Data

(63) Continuation of application No. 16/617,360, filed as application No. PCT/US2018/031439 on May 7, 2018, now Pat. No. 11,567,980.

(51) Int. Cl.
  *G06F 16/33* (2019.01)
  *G06F 16/215* (2019.01)
  (Continued)

(52) U.S. Cl.
  CPC ........ *G06F 16/3344* (2019.01); *G06F 16/215* (2019.01); *G06F 16/3329* (2019.01);
  (Continued)

(58) Field of Classification Search
  CPC ............... G06F 16/3344; G06F 16/215; G06F 16/3329; G06F 16/338
  See application file for complete search history.

(56) References Cited

U.S. PATENT DOCUMENTS 6,446,060 B1   9/2002  Bergman et al.
8,856,163 B2  10/2014  Brin et al.
(Continued)

OTHER PUBLICATIONS

Katz, B. et al., "Harnessing Language in Mobile Environments", International Conference on Semantic Computing; pp. 421-428; XP031138671, ISBN: 978-0-7695-2997-4 dated Sep. 1, 2007.
(Continued)

*Primary Examiner* — Richard L Bowen
*Assistant Examiner* — Aryan D Toughiry
(74) *Attorney, Agent, or Firm* — Gray Ice Higdon

(57) ABSTRACT

Implementations are directed to determining, based on a submitted query that is a compound query, that a set of multiple sub-queries are collectively an appropriate interpretation of the compound query. Those implementations are further directed to providing, in response to such a determination, a corresponding command for each of the sub-queries of the determined set. Each of the commands is to a corresponding agent (of one or more agents), and causes the agent to generate and provide corresponding responsive content. Those implementations are further directed to causing content to be rendered in response to the submitted query, where the content is based on the corresponding responsive content received in response to the commands.

20 Claims, 6 Drawing Sheets

(51) Int. Cl.
  *G06F 16/332* (2019.01)
  *G06F 16/338* (2019.01)
  *G10L 15/22* (2006.01)
  *G10L 15/26* (2006.01)

(52) U.S. Cl.
  CPC ............ *G06F 16/338* (2019.01); *G10L 15/22* (2013.01); *G10L 15/26* (2013.01)

(56) References Cited

U.S. PATENT DOCUMENTS

| | | | |
|---|---|---|---|
| 9,116,952 | B1 | 8/2015 | Heiler et al. |
| 9,547,690 | B2 | 1/2017 | Nowak-Przygodzki et al. |
| 2006/0294087 | A1 | 12/2006 | Mordvinov |
| 2013/0159306 | A1 | 6/2013 | Janssen, Jr. et al. |
| 2014/0289236 | A1 | 9/2014 | Agarwal et al. |
| 2015/0169631 | A1 | 6/2015 | Gu et al. |
| 2015/0348551 | A1 | 12/2015 | Gruber et al. |
| 2016/0092557 | A1 | 3/2016 | Stojanovic et al. |
| 2019/0014643 | A1 | 1/2019 | Gharabegian |
| 2019/0163785 | A1 | 5/2019 | Ramachandra Iyer |
| 2019/0205461 | A1 | 7/2019 | Rodgers |

OTHER PUBLICATIONS

Katz, B. et al., "Syntactic and Semantic Decomposition Strategies for Question Answering from Multiple Resources"; Proceedings of the AAAI 2005 Workshop on Inference for Textual Question Answering, pp. 35-41, XP055513017; URL:http://groups.csail.mit.edu/infolab/publications/Katz-etal-AAAI05W5.pdf [retrieved on Oct. 5, 2018] dated Jul. 1, 2005.

Katz, B, "using English for Indexing and Retrieving", pp. 1-30, XP055513000, Retrieved from Internet: URL:http://citeseerx.ist.psu.edu/viewdoc/download?doi=10.1.1.12.861&rep=rep1&type=pdf [retrieved on Oct. 5, 2018] Section: "Answering Questions"; p. 18-p. 22 dated Oct. 1, 1988.

European Patent Office; International Search Report and Written Opinion issued in Application No. PCT/US2018/031439; 18 pages; dated Oct. 18, 2018.

European Patent Office; Communication Pursuant to Article 94(3) issue in Application No. 18727936.9; 8 pages; dated Nov. 16, 2020.

European Patent Office; Summons to Attend Oral Hearings issued in Application No. 18727936.9, 8 pages, dated Feb. 1, 2022.

European Patent Office; Preliminary Opinion issued in Application No. 18727936.9, 6 pages, dated Jul. 6, 2022.

European Patent Office; Decision to Refuse issued in Application No. 18727936.9, 13 pages, dated Sep. 1, 2022.

European Patent Office; The Minutes from Oral Proceedings issued in Application No. 18727936.9, 7 pages, dated Aug. 31, 2022.

DETERMINING RESPONSIVE CONTENT FOR A COMPOUND QUERY BASED ON A SET OF GENERATED SUB-QUERIES

BACKGROUND

Computing systems may handle various queries from humans. For example, humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with computing systems may be referred to as "users") can provide commands, queries, and/or requests (collectively referred to herein as "queries") using free form natural language input which can be vocal utterances converted into text and then processed, and/or by typed free form natural language input.

Computing systems respond to queries with responsive content. For example, in response to a query of "What time is it in Paris, France" that is submitted to a search system, the search system can provide a response that reflects the current time in Paris, France. Also, for example, in response to an utterance of "Turn off the couch light" that is provided to an automated assistant, the automated assistant can cause the "couch light" to be turned off, and provide a response that acknowledges the couch light has been turned off. Although various computing systems can appropriately respond to many queries, many systems fail for compound queries. For example, many computing systems fail for a user utterance of "What time is it in Paris, France, what's the population, and what's the average high temperature in July". For instance, many computing systems fail by providing an erroneous response, not determining an appropriate response and instead providing a default error response, etc. As a result, users are often forced to split a compound query into multiple disparate queries, which can collectively require greater computer and/or network resources to process. Moreover, user interaction with the computing system is inhibited.

SUMMARY

Implementations described herein are directed to determining, based on a submitted query that is a compound query, that a set of multiple sub-queries are collectively an appropriate interpretation of the compound query. Those implementations are further directed to providing, in response to such a determination, a corresponding command for each of the sub-queries of the determined set. Each of the commands is to a corresponding agent (of one or more agents), and causes the agent to generate and provide corresponding responsive content. Further, those implementations are further directed to causing content to be rendered in response to the submitted query, where the content is based on the corresponding responsive content received in response to the commands.

Accordingly, implementations disclosed herein enable user submissions of compound queries, and the generation and provision of appropriate responses to those compound queries. This can result in improved human-computer interactions through, for example, lessening a quantity of input that needs to be provided by a user (e.g., provided by a user to an automated assistant interface). For example, a user can provide a single spoken utterance that includes a compound query and is of a first duration, in lieu of needing to provide multiple disparate utterances that are collectively of a second duration that is longer than the first duration. In addition to improving human-computer interactions (e.g., human-automated assistant interactions), such implementations can directly result in various computer and/or network efficiencies relative to, for example, technologies that instead require a user to split a compound query into multiple disparate queries. For example, a single spoken utterance that includes a compound query can be of a shorter duration and/or include fewer words than would multiple spoken utterances that split the compound query into multiple disparate queries. Voice-to-text and/or other processing of such a single spoken utterance can thus be more efficient than voice-to-text processing of the multiple spoken utterances. As another example, a single client-to-server transmission of the single spoken utterance (or a client-side voice-to-text conversion thereof) can be utilized to convey the compound query, in lieu of multiple (collectively higher data) transmissions that can be needed for multiple spoken utterances. As yet another example, a single server-to-client transmission can be utilized to provide content that is responsive to the compound query, the content can be of a smaller size than would multiple instances of content responsive to multiple spoken utterances, and/or the content can be rendered more efficiently (e.g., in less time) than would multiple instances of content responsive to multiple spoken utterances.

In various implementations, a user submits a compound query via speaking a single spoken utterance. For example, voice-to-text conversion of the single spoken utterance can be performed to generate text that corresponds to the compound query. For instance, the text "How far is Paris and what's the weather there" can be generated in response to a user providing a corresponding spoken utterance via an assistant interface of a client device. The assistant interface can be implemented via an automated assistant client of the client device, and enables user interaction with an automated assistant that can be implemented via the automated assistant client and/or via one or more remote computing device(s) (e.g., cloud-based automated assistant component(s)).

Implementations described herein generate one or more sets of sub-queries, where each of the sub-queries of each of the sets collectively represent one interpretation of the compound query. As one example, and continuing with the previous example, a set of sub-queries can be generated that includes a sub-query of "How far is Paris" and "What's the weather in Paris."

Further, a quality score can be determined for each of the set(s) of sub-queries. If the quality score for one of the sets satisfies a threshold, it can be selected as the set to be utilized in obtaining and/or providing content for rendering in response to the compound query. In some implementations, determining the quality score for a given set satisfies a threshold can include: determining it satisfies a threshold relative to the quality score(s) for other set(s) (thereby indicating the sub-queries of the given set are a more appropriate interpretation than the sub-queries of other sets); determining it satisfies a threshold relative to a compound query quality score that is optionally determined for the compound query without its splitting into sub-queries (thereby indicating splitting the compound query into sub-queries is more appropriate than not splitting the compound query); and/or determining it satisfies a fixed threshold (thereby indicating the sub-queries of the given set are a coherent interpretation). In some implementations, in determining a quality score for a set of sub-queries, an individual quality score for each of the sub-queries of the set can be determined, and the quality score for the sub-queries of the set can then be determined based on the individual quality scores for the sub-queries of the set. The quality score for a given set can be indicative of, for example, likelihood that the set correctly represents the intent of the separate queries that are included in the text. For example, for the compound query "What's the weather in Turks and Caicos and Haiti," a first set of sub-queries can be generated that includes "What's the weather in Turks," "What's the weather in Caicos," and "What's the weather in Haiti" (i.e., a set that does not correctly reflect the user's intention because "Turks and Caicos" is a single country). Further, a second set of sub-queries can be generated that includes "What's the weather in Turks and Caicos" and "What's the weather in Haiti", with the countries correctly separated. A first quality score can be determined for the first set, and a second quality score can be determined for the second set, according to techniques described herein, and the second set (which is an appropriate reflection of the intention of the user), can be selected over the first set based on the first and second quality scores.

As mentioned above, if the quality score for one of the sets satisfies a threshold, it can be selected as the set to be utilized in obtaining and/or providing content for rendering in response to the compound query. For each of the sub-queries of the selected set, a command is generated and provided to a corresponding agent, responsive content is received from the corresponding agent, and content is provided for rendering, where the content is based on the responsive content received from the agent(s). An agent to which a command is provided can be, for example, a general search system or a particularized agent, such as a first-party (1P) or third-party (3P) assistant agent described herein. As one example, for a sub-query of "What's the weather in Paris," a structured command can be provided to a weather agent that requests current weather in "Paris". As another example, for a sub-query of "Turn on the couch light", a structured command can be provided to a 3P lighting agent that causes the 3P agent to turn a "couch light" (mapped to the client device via which the compound query was submitted) to an "on" state. As yet another example, for a sub-query of "can an ant jump", a command that conforms to the query can be submitted to a search system. In some implementations, multiple commands generated from a set of sub-queries can be provided to a single agent, whereas in other implementations a first command is provided to a first agent, a second command is provided to a second agent, etc.

In response to being provided a command, the corresponding agent(s) provide responsive content. Content, that is based on the responsive content, can then be rendered to the user. The content that is rendered can be the responsive content itself, or content that is determined based on the responsive content, but that does not strictly conform to the responsive content. For example, in response to a first sub-query of a set responsive content from a weather agent can include the text "80 degrees and sunny" and in response to a second query of a set responsive content from a lighting agent can include a "confirmation" that a lighting command was implemented. The content that is caused to be rendered can include an audible "ding" that indicates the lighting command was implemented, as well as spoken output of "80 degrees and sunny", that is a text-to-speech conversion of the text "80 degrees and sunny". In some implementations, the responsive content can be rendered utilizing one or more terms from the original sub-queries. For example, for a command of "Paris" sent to a weather agent that was generated based on a sub-query of "What's the weather in Paris," the agent may provide a result of "68" and the responsive content can be rendered to the user via a voice response of "The weather in Paris is 68 degrees Fahrenheit right now," with the term "Paris" identified from the sub-query. In some implementations, the responsive content from the assistant agents can be utilized to generate an additional sub-query, with the responsive content from the additional sub-query being rendered to the user.

In some implementations, one or more entities can be identified in the query text and may be utilized to generate the sub-queries of a set. For example, for a text of "Tell me how long it would take to bike 25 miles and run 2 miles," aliases of entities associated with "biking" and "running" may be identified. Sub-queries can be generated that include a pattern that is commonly used as a search query, such as a pattern of "How long would it take to travel <distance> by <mode of transportation>." Because the query includes pairs of distances and modes of transportation, a set of two sub-queries is generated: "How long would it take to travel 25 miles by bike" and "How long would it take to travel 2 miles by running." In some instances, multiple patterns can be identified in a single text (e.g., "I want to go to Paris, show me restaurants and hotels there."

As another example, patterns can include one or more terms and/or entities, such as "What's the weather in <city>," with <city> being a placeholder for an alias of a city entity. Thus, for a query of "What's the weather in Paris and Rome," sub-queries of "What's the weather in Paris" and "What's the weather in Rome" can be generated based on similarity between terms in the text and terms in the pattern. In some instances, commonly recognized patterns can be associated with available agents and the common patterns may be utilized to determine a sub-query. For example, a weather agent may be associated with common patterns of "weather in <city>," "weather in <city> on <date>," and/or "temperature in <city>." The associated patterns can then be utilized to generate one or more sub-queries based on entities in the text and similarity between the patterns and the text.

In some implementations, one or more of the sub-queries can be generated based on a prefix and/or a suffix in the text (i.e., one or more terms at the start and end of the text, respectively). For example, a text of "When were Romania and Poland founded" includes a prefix of "When were" and a suffix of "founded." A set can be generated that includes the sub-queries of "When was Romania founded" and "When was Poland founded," two sub-queries that include both the prefix (with a re-conjugation of the verb) and suffix of the original text.

As another example, one or more sub-queries can be generated based on a text that includes only a prefix or only a suffix. For example, a text of "turn on the kitchen lights and the TV in the living room" includes a prefix of "turn on" that is applicable to two different actions (i.e., turning on a lighting fixture in the kitchen and turning on the television in the living room). A set can be generated that includes the sub-queries "turn on the kitchen lights" and "turn on the living room TV" by appending the prefix "turn on" to each of the sub-queries.

The above description is provided as an overview of various implementations disclosed herein. Those various implementations, as well as additional implementations, are described in more detail herein.

In one aspect, a method implemented by one or more processors is provided that includes receiving text that is generated in response to detection of a single spoken utterance of a user at an assistant interface of a client device of the user, the text corresponding to the single spoken utterance and being generated based on a voice-to-text conversion of the single spoken utterance, generating, based on the text, a set of sub-queries, the sub-queries of the set including at least a first sub-query and a second sub-query, wherein the sub-queries of the set collectively define one candidate interpretation of the text, determining a quality score for the set of sub-queries, and determining that the quality score for the set of sub-queries satisfies at least one threshold. In response to determining that the quality score satisfies the threshold, the method further includes providing, for each of the sub-queries of the set, a corresponding command to a corresponding assistant agent, the corresponding commands including at least a first command based on the first sub-query and a second command based on the second sub-query, receiving, in response to providing the corresponding commands, corresponding responsive content, the corresponding responsive content including at least first responsive content that is in response to the first command and second responsive content that is in response to the second command; and causing the client device to render content to the user that is based on the corresponding responsive content.

These and other implementations of the technology disclosed herein can include one or more of the following features.

In some implementations, causing the client device to render content to the user can include causing the client device to render first content based on the first responsive content and further include causing the client device to render second content based on the second responsive content.

In some implementations, the first command is provided to a first assistant agent, and the first assistant agent is a third-party agent that is controlled by a third party that is distinct from a party that controls the assistant interface. In those implementations, the first command can be a structured command that is generated based on the first sub-query and that causes the first assistant agent to alter a state of a first connected device, and the first responsive content can comprise a confirmation that altering of the state occurred in response to the structured command.

In some implementations, the method can further include generating, based on the text, a second set of second sub-queries that are unique from the sub-queries of the set, and that collectively define an additional candidate interpretation of the text, and determining an additional quality score for the second set of second sub-queries. Further, determining that the quality score for the set of sub-queries satisfies the threshold can based on comparison of the quality score, for the set, to the additional quality score, for the second set.

In some implementations, determining the quality score for the set can include determining a first quality score for the first sub-query, determining a second quality score for the second sub-query, and determining the quality score for the set as a function of the first quality score and the second quality score. In some of those implementations, determining the first quality score for the first sub-query can comprise determining whether the first sub-query conforms to one or more recognized commands for any assistant agent, and determining the second quality score for the second sub-query can comprise determining whether the second sub-query conforms to one or more of the recognized commands for any assistant agent.

In some implementations, the set can include at least three sub-queries.

In some implementations, generating the set can include generating a first portion of the text and a second portion of the text, wherein the first portion is unique from the second portion; and generating the first sub-query can be based on the first portion. Further, in those implementations, generating the second sub-query can be based on the second portion and based on one or more terms of the text that are not included in the second portion of the text. In some versions of those implementations, generating the first sub-query may be further based on one or more terms of the text that are not included in the first portion of text. In some versions of those implementations, the one or more terms that are not included in the second portion of the text and that are utilized in generating the second sub-query can include at least one term from the first portion of the text. In some of those versions, the one or more terms that are not included in the second portion of the text and that are utilized in generating the second sub-query can include at least one term that occurs before the first portion of the text. In some of those versions, the one or more terms that are not included in the second portion of the text and that are utilized in generating the second sub-query can include at least one term that occurs after the second portion of text.

In some implementations, generating the set can include identifying aliases of one or more entities that are included in the text, identifying a first pattern based on the text, wherein the first pattern includes one or more terms and an entity type, generating a first portion based on the first pattern, identifying a second pattern based on the text, wherein the second pattern includes one or more second terms and the entity type, or an additional entity type, generating a second portion based on the second pattern, replacing the entity type in the first portion with a corresponding one of the aliases to generate a first sub-query, and replacing the entity type or the additional entity type in the second portion with a corresponding one of the aliases to generate a second sub-query. In some of those versions, the first pattern and the second pattern are unique, and the alias in the first-subquery can be the same as the alias in the second sub-query. In some versions of those implementations, the first pattern and the second pattern can be the same, and the alias in the first sub-query can be different than the alias in the second sub-query.

In some implementations, the method can further include generating an aggregate query based on the responsive content, providing an aggregate command to one or more additional assistant agents based on the aggregate query, and receiving, in response to providing the aggregate command, aggregate responsive content from the one or more additional assistant agents that is based on the aggregate responsive content.

In some implementations, the method can further include determining a text quality score for the text, where determining that the quality score for the set of sub-queries satisfies the threshold can be based on comparison of the quality score to the text quality score. Further, in response to the quality score for the set of sub-queries satisfying the threshold, the method can further include generating the commands based on the set of sub-queries, in lieu of generating the commands based on the text.

In another aspect, another method implemented by one or more processors is provided and includes receiving text that is generated in response to user input at an interface of a client device of the user, generating, a set of sub-queries based on the text that includes at least a first sub-query and a second sub-query, wherein the sub-queries of the set collectively define one candidate interpretation of the text, determining a set quality score for the set of sub-queries, determining a text quality score for the text, and determining that the quality score for the set of sub-queries satisfies at least one threshold, including a threshold relative to the text quality score for the text. In response to determining that the quality score satisfies the threshold, the method further includes providing, for each of the sub-queries of the set, a corresponding command to a corresponding agent, the corresponding commands including at least a first command based on the first sub-query and a second command based on the second sub-query, receiving, in response to providing the corresponding commands, corresponding responsive content, including at least first responsive content that is in response to the first command and second responsive content that is in response to the second command, and causing the client device to render content to the user that is based on the corresponding responsive content.

In another aspect, another method implemented by one or more processors is provided and includes receiving text that is generated in response to user input at an interface of a client device of the user, generating, based on the text, a set of sub-queries, the sub-queries of the set including at least a first sub-query and a second sub-query, the sub-queries of the set collectively defining one candidate interpretation of the text, determining a set quality score for the set of sub-queries, and determining that the quality score for the set of sub-queries satisfies at least one threshold, including a threshold relative to the text quality score for the text. In response to determining that the quality score satisfies the threshold, the method further includes providing, for each of the sub-queries of the set, a corresponding command to a corresponding agent, the corresponding commands including at least a first command based on the first sub-query and a second command based on the second sub-query, receiving corresponding responsive content in response to providing the corresponding commands, including at least first responsive content that is in response to the first command and second responsive content that is in response to the second command, and causing the client device to render first content to the user that is based on the first responsive content and to render second content to the user that is based on the second responsive content.

These and other implementations of the technology disclosed herein can include one or more of the following features.

In some implementations, the method further includes determining that the text satisfies one or more conditions. Generating the set of sub-queries may be performed only after determining the text satisfies one or more conditions.

In another aspect, a method implemented by one or more processors is provided, the method including receiving text that is generated in response to detection of a single spoken utterance of a user at an assistant interface of a client device of the user, the text corresponding to the single spoken utterance and being generated based on a voice-to-text conversion of the single spoken utterance, generating a first portion of the text and a second portion of the text, wherein the first portion is unique from the second portion, generating a first sub-query based on the first portion, generating a second sub-query based on the second portion and based on one or more terms of the text that are not included in the second portion of the text, providing, for each of the sub-queries of the set, a corresponding command to a corresponding assistant agent, the corresponding commands including at least a first command based on the first sub-query and a second command based on the second sub-query, receiving, in response to providing the corresponding commands, corresponding responsive content, the corresponding responsive content including at least first responsive content that is in response to the first command and second responsive content that is in response to the second command, and causing the client device to render content to the user that is based on the corresponding responsive content.

In addition, some implementations include one or more processors of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
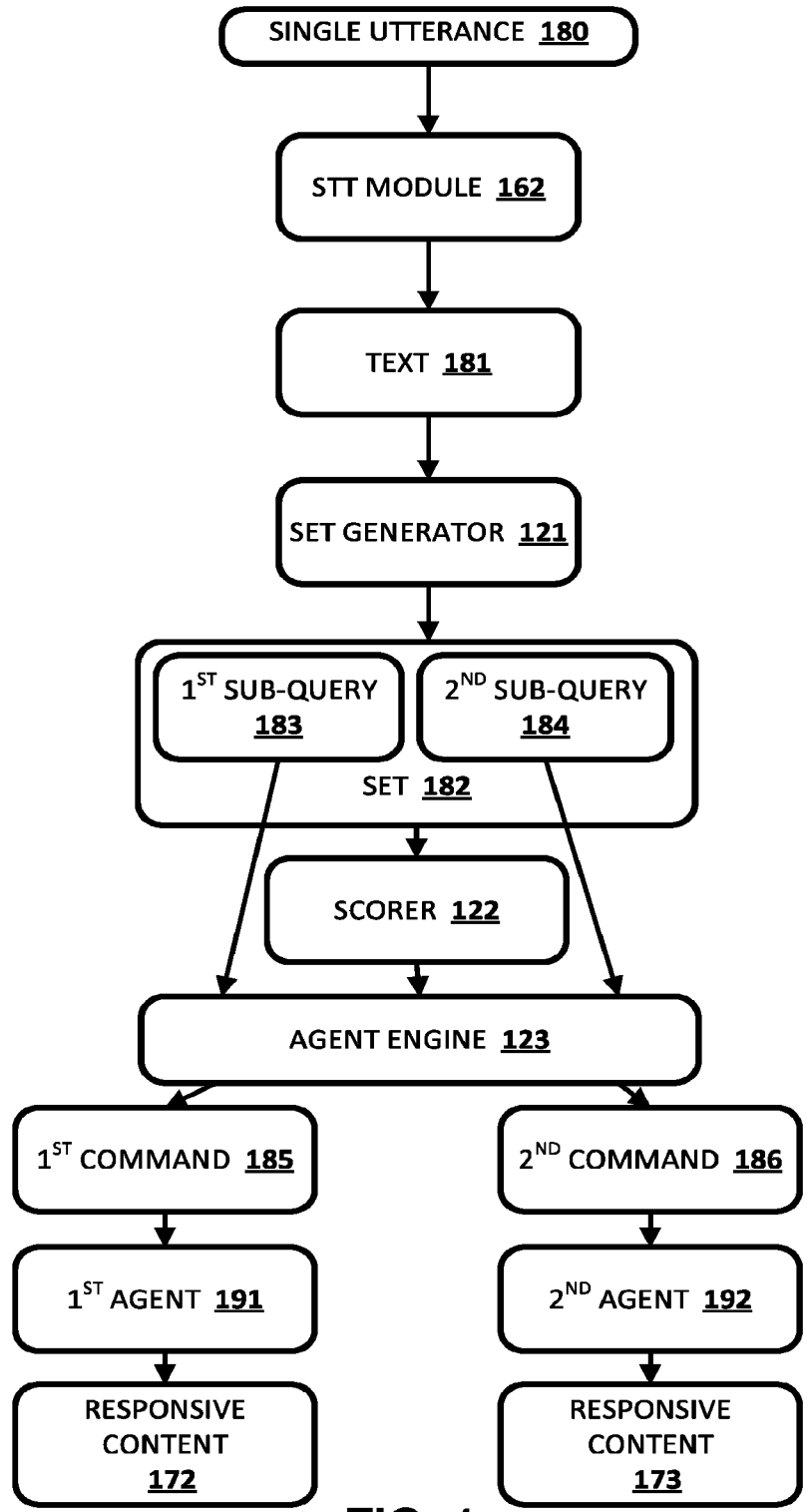
FIG. 1 depicts an example process flow that demonstrates an example of generating a set of multiple sub-queries from a single utterance, and generating responsive content for each of the sub-queries of the set, according to various implementations disclosed herein.

Turning initially to FIG. 1, a single spoken utterance 180 of a user is received. For example, the single spoken utterance 180 can be generated based on output from one or more microphones of a client device, and can be embodied in audio data that is generated by the one or more microphones in response to the user speaking the spoken utterance. The single spoken utterance 180 can be an uninterrupted utterance of a user, such as a single utterance as determined by a voice activity detector based on analysis of the audio data.

The spoken utterance 180 is provided to a speech-to-text module 162, which converts the spoken utterance 180 into text 181. In some instances, the single spoken utterance 180 can include a compound query, in that it includes multiple sub-queries that are combined into the single utterance. For example, the text 181 "I want to go to Paris, show me hotels and the weather" includes two separate, but related queries. One sub-query relates to hotels in Paris and a second sub-query relates to the current weather in Paris.

Although the technique illustrated in FIG. 1 begins with an input of a single spoken utterance 180, the text 181 may be received from a user via one or more alternate sources. For example, a user may directly submit text 181, such as via a virtual keyboard (e.g., via a touch sensitive display) and/or via another input device. Thus, although described in FIG. 1 as originating from a single spoken utterance, the text 181 can be generated based on any single input from a user.

As described in more detail below, set generator 121 can generate one or more sets of sub-queries (e.g., set 182) based on the text 181, and a given set of sub-queries can be selected as a set for which responsive content should be generated, and corresponding content rendered in response to the single utterance 180. For example, a given set can be selected based on the scorer 122 determining that a quality score for the given set satisfies at least one threshold. In some of those implementations, the scorer 122 can also determine a quality score for the text 181 itself, and the given set selected based on determining its quality score satisfies a threshold relative to the quality score for the text 181 itself. In other words, in those implementations a given set of sub-queries is only selected for utilization in lieu of the text 181 itself if the quality score for the selected given set satisfies a threshold relative to the quality score for the text 181 (and optionally if it satisfies one or more other threshold(s)).

In some implementations, the set generator 121 always generates one or more sets and quality scores for the generated sets are compared to a quality score for the text 181. In some implementations, generation of the set(s) by the set generator 121 is contingent on the text 181 satisfying one or more criteria. For example, the one or more criteria can include that a quality score for the text 181 fails to satisfy a threshold, thereby indicating that responsive content (if any) for the text 181 is of a low quality. Also, for example, the one or more criteria can additionally or alternatively include that that the text 181 does not match required input to any single agent, that the text 181 fails to return any "non-error" responsive content from one or more (e.g., any) agent, etc. Also, for example, the one or more criteria can additionally or alternatively include that the text 181 includes one or more terms that are indicative of a likely compound query (e.g., the text 181 includes the term "and").

Set generator 121 generates one or more sets of sub-queries, such as a set 182 that includes two or more sub-queries 183 and 184. Although set 182 is illustrated as including two sub-queries, set generator 121 can generate a set that includes any number of sub-queries, as further described herein. For example, a text 181 of "What are the populations of Paris and London, and who are their mayors" may result in a set 182 that includes sub-queries of "What is the population of Paris," "What is the population of London," "Who is the mayor of Paris," and "Who is the mayor of London." In generating the set 182, set generator 121 can utilize one or more of various techniques, such as those described further herein.

Figure 2:
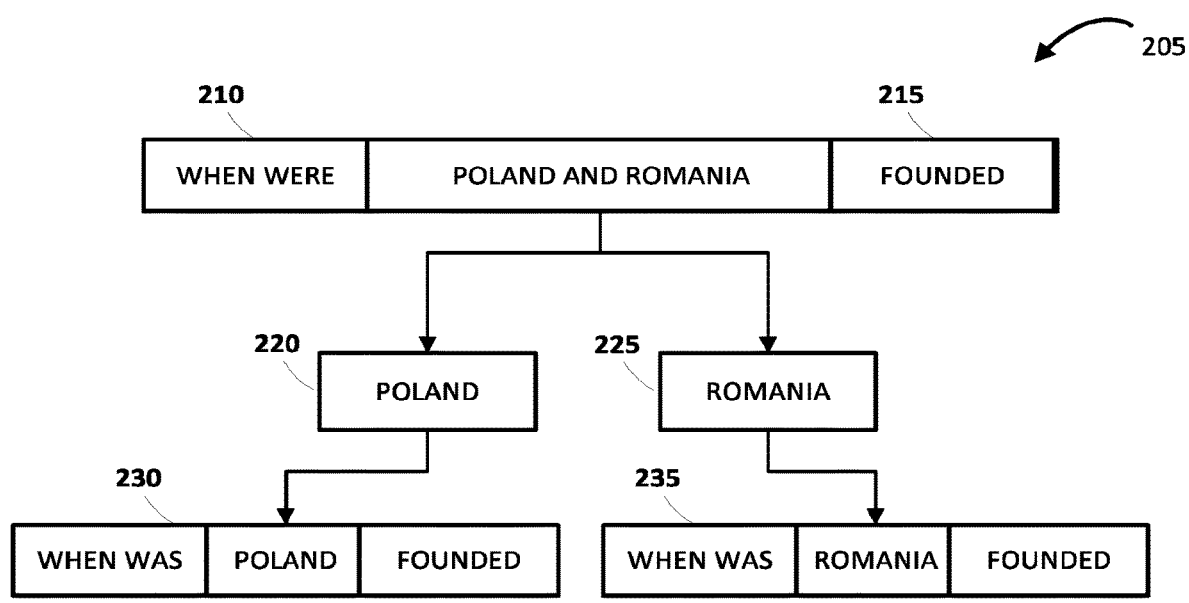
FIG. 2 depicts an example process flow that demonstrates an example of generating a set of sub-queries from text that includes a compound query, according to various implementations disclosed herein.

In some implementations, set generator 121 can generate sub-queries 183 and 184 based on a prefix occurring at the start of the text 181 and/or a suffix occurring at the end of the text 181. For example, and referring to FIG. 2, the text "When were Poland and Romania founded" 205 includes a prefix "When were" 210 and a suffix 215 "founded." Set generator 121 can determine that the non-prefix and non-suffix portion of the text 205, "Poland and Romania," can be split into two sub-queries based on, for example, two terms that are both countries separated by an "and." Thus, set generator 121 splits the middle portion into two portions, "Poland" 220 and "Romania" 225. The prefix 210 and suffix 215 can then be appended to the portion 220 and the portion 225, resulting in sub-queries of "When was Poland founded" 230 and "When was Romania founded" 235. As illustrated in this example, some terms of prefixes and/or suffixes may be slightly altered, such as verb conjugation, when the prefix and/or suffix is appended to the portions to allow for subject agreement. Further, although the example of FIG. 2 includes both a prefix and a suffix, in some situations set generator 121 may only append a prefix or only append a suffix, depending on the initial text 181. For example, for a text of "Turn on the kitchen lights and the living room TV," the prefix of "Turn on" can be utilized to generate sub-queries of "Turn on the kitchen lights" and "Turn on the living room TV."

In some implementations, set generator 121 can generate sub-queries 183 by identifying one or more patterns in the text 181. Patterns can be identified from a database that includes frequent search query patterns, frequent spoken commands, and/or other frequent queries. Frequent patterns can be identified based on logs of previous commands. Also, for example, one or more agents can be associated with patterns that are commonly recognized input to the particular agent and set generator 121 can check for terms in the text 181 that are close to or common with available agent commands. For example, an agent that provides temperature at a location can be associated with common patterns for inquiring about weather, such as "What is the current temperature in <city>" and/or "What's the weather in <city>." Also, for example, an agent that controls one or more lighting fixtures can have associated patterns of "Turn on the lights" and/or "Turn off the <room> lights."

In some implementations, set generator 121 can be provided with text 181 that has been tagged with parts of speech, entities, and/or other contextual information. The tags of the text 181 can be utilized to identify potential patterns that can be provided to agents. For example, set generator 121 can receive a text of "I want to go to Paris, show me bars and what's the weather there" with tagged terms, including "Paris" tagged as a <city> entity. Based on terms in the text, set generator 121 can identify common queries of "bars in <city>" and "weather in <city>." Based on the identified patterns, set generator 121 can generate a first sub-query of "bars in Paris" and a second query of "weather in Paris" by replacing the entity placeholder with the city tagged in the text 181. As another example, text of "I want to go Paris or Rome. What's the weather there" can result in identification of a pattern of "weather in <city>" and generation of sub-queries "weather in Paris" and "weather in Rome."

In some implementations, set generator 121 can generate sub-queries 183 by contextually expanding the text 181. Contextual expansion includes identifying a list of entities in the text 181, and further identifying one or more term and/or patterns in the text 181. Thus, the list of entities can be utilized to expand the text into multiple sub-queries for each of the entities in the list. For example, for a text of "What are the populations of Rome, Paris, and London, and who are their mayors," a list of <city> entities is identified that includes "Rome," "Paris," and "London." Two patterns are further identified in the text: "Population of <city>" and "Mayor of <city>." Set generator 121 can then generate a set that includes the sub-queries of "population of Rome,"

"population of Paris," "population of London," "mayor of Rome," "mayor of Paris," and "mayor of London" by applying each of the entities to each of the identified patterns.

Once the set 182 of sub-queries 183 and 184 has been generated, the set 182 is provided to set scorer 122 to determine a quality score for the set 182. In some implementations, the scorer 122 determines a quality score that is indicative of a likelihood that the user that submitted text 181 has interest in obtaining results from the sub-queries of the set 181. For example, for a set 182 that includes the sub-queries "Weather in Paris" and "hotels in Paris," scorer 122 can determine a quality score that is indicative of likelihood that the inquiries included in an original text 181 of "I want to go to Paris, show me the weather and hotels there" is represented by the sub-queries. In some implementations, the quality score may be indicative of likelihood that one or more available agents will accept the sub-queries as input. For example, set generator 121 can generate a set that includes the sub-queries of "What's the weather in Paris" and "What's the weather in London" and determine a quality score indicative of likelihood that a weather agent will provide meaningful responsive content based on the sub-queries.

In some implementations, the original text 181 can be provided to the set scorer 122 in addition to the set 182. A quality score can be determined for the set 182 that is indicative of whether the set 182, if provided to one or more agents, will result in meaningful content from the available agents. For example, for a text of "What's the weather in Trinidad and Tobago," set generator 121 can generate sub-queries of "weather in Trinidad" and "weather in Tobago." However, because "Trinidad and Tobago" is a single country, the original text of "What's the weather in Trinidad and Tobago" may provide a more meaningful result than the sub-queries. Thus, a quality score for the original text may be more indicative of quality than a quality score for the set. Accordingly, in those implementations the original text 181 can be utilized to generate commands to provide to an agent, and responsive content from the agent can be utilized to render content to the user. Accordingly, user interaction with an automated assistant can be improved by providing commands based on a set of sub-queries only when the set is more likely to provide meaningful responsive content as compared to the original text.

In some implementations, a quality score can be determined based on quality scores of each of the sub-queries of the set 182. For example, the set 182 may be provided to scorer 122, which can then determine a quality score for each of the sub-queries 182 and 183. These quality scores can be based on, for example, likelihood that each of the sub-queries are valid input to an agent and/or based on whether the sub-queries are a good candidate for representing the text 181. In some implementations, scorer 122 may have access to one or more databases (not depicted) that include, for instance, a plurality of mappings between grammars and responsive actions (or more generally, intents), visual cues and responsive actions, and/or touch inputs and responsive actions. For example, the grammars included in the mappings can be selected and/or learned over time, and may represent common intents of users. For example, one grammar, "turn off the <room> lights", may be mapped to an intent that invokes a responsive action that causes one or more lights in <room> to turn off. Another grammar, "[weather forecast] today," may be match-able to user queries such as "what's the weather today" and "what's the forecast for today?" In some implementations, a quality score for a sub-query may be based on frequency of the sub-query appearing in one or more prior query logs. In some implementations, a quality score for a sub-query may be determined based on the number of search results (and/or quality of search results) that are responsive to the sub-query. In some implementations, a quality score can be determined based on whether the subquery corresponds to a voice action operation. In some implementations, a quality score for a sub-query can be based one or more of a number of terms in a sub-query that are not in the text or a number of terms that are not in any sub-query in the set but are in the text. The quality scores for the sub-queries can then be utilized to generate an overall set quality score for the set 182.

The set 181 is provided to the agent engine 123 if the quality score of the set 182 satisfies a threshold. For example, a quality score determined by the scorer 122 can range from 0 to 1.0, with 1.0 being an ideal candidate for representing the text 181 and/or exact matches to one or more patterns associated with available agents. The sub-queries 182 and 183 can be provided to the agent engine 123 if, for example, the set quality score exceeds a threshold quality, such as 0.8. In some implementations, the text 181 can be provided instead to the agent engine 123 if the set quality score does not satisfy a threshold. In some implementations, multiple sets 182 can be generated, scored by scorer 122, and only the set 182 with the quality score most indicative of quality may be provided to agent engine 123. For example, a first set can be generated and the determined quality score can be 0.6, whereas a second set can be generated with a determined quality score of 0.8. Only the set with the higher quality score can be provided to agent engine 123.

As an example, set generator 121 generates a first set and a second set based on a text. Each of the sets can then be scored by scorer 122. Further, the original text is scored by scorer 122. If, for example, the first set is determined to have a quality score of 0.8, the second set is determined to have a quality score of 0.7, and the set is determined to have a quality score of 0.6, the first set can be provided to the agent engine 123 because the quality score of the first set is higher than both the quality score of the second set and the quality score of the text. Also, for example, a set (or text) may have to meet a base threshold before being provided to the agent engine 123. In the preceding example, a base threshold may be 0.75 and the quality score of the first set is the only quality score that satisfies the base threshold. Thus, the first set is provided to the agent engine 123.

Agent engine 123 determines a command to provide to agents for each sub-query of the set. A command includes one or more terms that are directly provided to an agent that convey the necessary information from a sub-query. For example, a user can provide a query of "What's the weather in Paris," which includes one or more terms that are not necessary to provide to an agent to receive valid responsive content. Agent Engine 123 can instead generate a command of "Paris" and provide the command to a weather agent. Also, for example, for a query of "What is the weather in Paris tomorrow," agent engine 123 may generate a command of "Paris, tomorrow" to a weather agent.

For each of the sub-queries 183 and 184, agent engine 123 generates a command 185 and 186 to provide to agents 191 and 192. As used herein, an "agent" references one or more computing devices and/or software that are utilized by an automated assistant. In some situations, an agent can be separate from the automated assistant and/or can communicate with the automated assistant over one or more communication channels. In some of those situations, the automated assistant can transmit, from a first network node, data (e.g., an agent command) to a second network node that implements all or aspects of the functionality of the agent. In some situations, an agent may be a third-party (3P) agent, in that it is managed by a party that is separate from a party that manages the automated assistant. In some other situations, an agent may be a first-party (1P) agent, in that it is managed by the same party that manages the automated assistant.

An agent is configured to receive (e.g., over a network and/or via an API) an invocation request and/or other agent commands from the automated assistant. In response to receiving an agent command, the agent generates responsive content based on the agent command, and transmits the responsive content for the provision of user interface output that is based on the responsive content. For example, the agent can transmit the responsive content to the automated assistant for provision of output, by the automated assistant, that is based on the responsive content. As another example, the agent can itself provide the output. For instance, the user can interact with the automated assistant via a client device (e.g., the automated assistant can be implemented on the client device and/or in network communication with the client device) and the agent can be an application installed on the client device or an application executable remote from the client device, but "streamable" on the client device. When the application is invoked, it can be executed by the client device and/or brought to the forefront by the client device (e.g., its content can take over a display of the client device).

In some situations, in response to invocation of a particular agent according to techniques disclosed herein, a human-to-automated assistant dialog may be at least temporarily transferred (actually or effectively) to the particular agent. For example, output that is based on responsive content of the particular agent can be provided to the user in furtherance of the dialog, and further user input received in response to the output. The further user input (or a conversion thereof) can be provided to the particular agent. The particular agent can utilize its own semantic engines and/or other components in generating further responsive content that can be used to generate further output for providing in furtherance of the dialog. This general process may continue until, for example, the particular agent provides responsive content that terminates the particular agent dialog (e.g., an answer or resolution instead of a prompt), additional user interface input of the user terminates the particular agent dialog (e.g., instead invokes a response from the automated assistant or another agent), etc.

In some situations, the automated assistant can still serve as an intermediary when the dialog is effectively transferred to the particular agent. For example, in serving as an intermediary where natural language input of a user is voice input, the automated assistant can convert that voice input to text, provide the text (and optionally annotations of the text) to the particular agent, receive responsive content from the particular agent, and provide output that is based on the particular responsive content for presentation to the user. Also, for example, in serving as an intermediary, the automated assistant can analyze user input and/or responsive content of the particular agent to determine if dialog with the particular agent should be terminated, if the user should be transferred to an alternate agent, if global parameter values should be updated based on the particular agent dialog, etc. In some situations, the dialog can be actually transferred to the particular agent (without the automated assistant serving as an intermediary once transferred), and optionally transferred back to the automated assistant upon occurrence of one or more conditions such as termination by the particular agent (e.g., in response to completion of an intent via the particular agent).

As illustrated, the flowchart includes only two sub-queries in the set 182; however, the set 182 can include any number of sub-queries and agent engine 123 can generate a command for each of the plurality of sub-queries. In some implementations, a command can be based on one or more key words included in the corresponding sub-query. For example, set generator 121 can generate a first sub-query 183 of "What's the weather in Paris" and a second sub-query 184 of "Show me restaurants in Paris." Once the set has been scored and the quality score of the 182 satisfies a threshold, agent engine 123 identifies a first agent 191 that is a weather agent (i.e., that returns meaningful responsive content based on the first sub-query 183) and a second agent 192 that provides entertainment locations. Agent engine 123 generates a first command 185 of "Paris" to provide to the first agent 191 and a second command 186 of "Paris, restaurants" to provide to the second agent 192.

In some implementations, multiple commands from sub-queries can be provided to the same agent. For example, set generator 121 can generate a set 181 that includes sub-queries of "What's the weather in London" and "What's the weather in Paris." Both sub-queries can result in commands that can both be provided to the same agent (e.g., "London" and "Paris" provided to a weather agent).

In response to being provided commands, agents 191 and 192 provide responsive content 172 and 173. Responsive content can include, for example, written text, images, audio, and/or other media that can be provided to a user. For example, a "weather" agent may receive a command that includes a location and can provide text that describes the current weather at the location, an image that illustrates the weather (e.g., an image of rain, the temperature), and/or an audio description of the weather. Also, for example, an agent that is associated with controls for one or more lighting fixtures of the user can receive a command that indicates a particular light and an intent for the user to change the settings of the light (e.g., "living room, dim to 50%") and can provide responsive content that includes an acknowledgement that the action was successfully performed. In some implementations, an agent commands can be structured commands that identify an "intent" and values for one or more slots, where the "intent" and value(s) are generated based on the sub-query. For example, for a sub-query of "turn on couch light," the intent of "turn on" may be paired with a value of "couch light" (or some other associated identifier of a particular light) and a second slot can include an identifier of the user and/or client device so that the agent can determine who is making the request.

Based on receiving responsive content 172 and 173, content can then be provided to a device of the user for rendering corresponding content to the user. Rendering content can include, for example, providing visual output to the user, providing textual output to the user, and/or providing audio output to the user. The form of the rendered content can vary based on the hardware and/or software capabilities of the device of the user. For example, the rendered content can be provided to a smartphone, with the rendered content provided as audio and an image. Also, for example, the rendered content can be provided to an assistant device that includes only a speaker, and rendered as audio only. In some implementations, the content rendered by the client device may not be the same as the responsive content 172 and 173. For example, an agent may provide responsive content as a text and the text can be utilized to generate speech, which is then rendered by the client device.

In some implementations, responsive content 172 and 173 can be rendered with additional terms from the sub-queries 183 and 184. For example, a command of "Paris" may be provided to a weather agent for a sub-query of "What's the weather in Paris." The agent can provide responsive content of "72, sunny, with a chance of rain later." However, when the responsive content is rendered, the terms "the weather in Paris" may be identified from the sub-query and further utilized to render content, such as "The weather in Paris is 72, sunny, with a chance of rain later" so that the user has context as to what query is being answered by the responsive content. Also, for example, for a query of "Turn off the kitchen lights," responsive content can only include an indication of success in turning off a light. Thus, to provide context, the responsive content may be rendered as "Kitchen lights are now off" based on the initial query (and/or the command provided to the agent).

Figure 3:
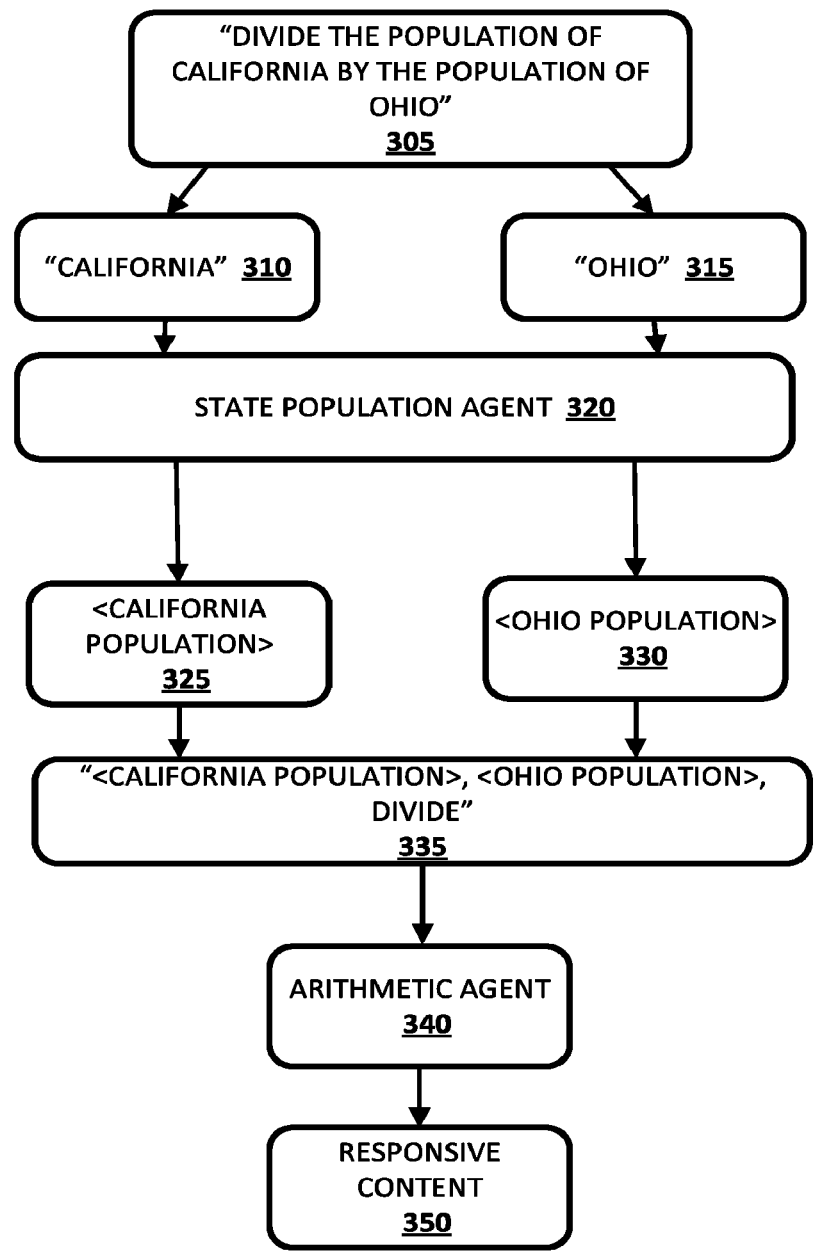
FIG. 3 illustrates an example process flow that demonstrates an example of generating responsive content for multiple subqueries generated based on a compound query, and utilizing the responsive content in generating content for rendering in response to the compound query, according to various implementations described herein.

In some implementations, responsive content 172 and 173 is not immediately rendered by the client device but can instead by utilized by agent engine to submit a new command to an agent. The subsequent responsive content can then be rendered to the user. For example, referring to FIG. 3, an example process flow is provided that demonstrates an example of generating responsive content for multiple sub-queries generated based on a compound query, and utilizing the responsive content in generating content for rendering in response to the compound query. For the illustrated example, a text 305 of "Divide the population of California by the population of Ohio" results in commands of "California" 310 and "Ohio" 315. These commands can be generated by agent engine 123 based on sub-queries of "What's the population of California" and "What's the population of Ohio," each generated by set generator 121. The commands can be provided to an assistant agent 320, which accepts commands of a state and provides the population of the state. Responsive content is then received from the agents that includes a "California population" 325 and an "Ohio population 330," each a number representing the respective populations of the states. A new aggregate command 335 can then be generated that is an aggregate of the responsive contents 325 and 330. The aggregate command 335 is then provided to an arithmetic agent 340, which accepts two numbers and an operation. The subsequent responsive content 350, a number, can then be utilized to cause the client device to render content.

Figure 4:
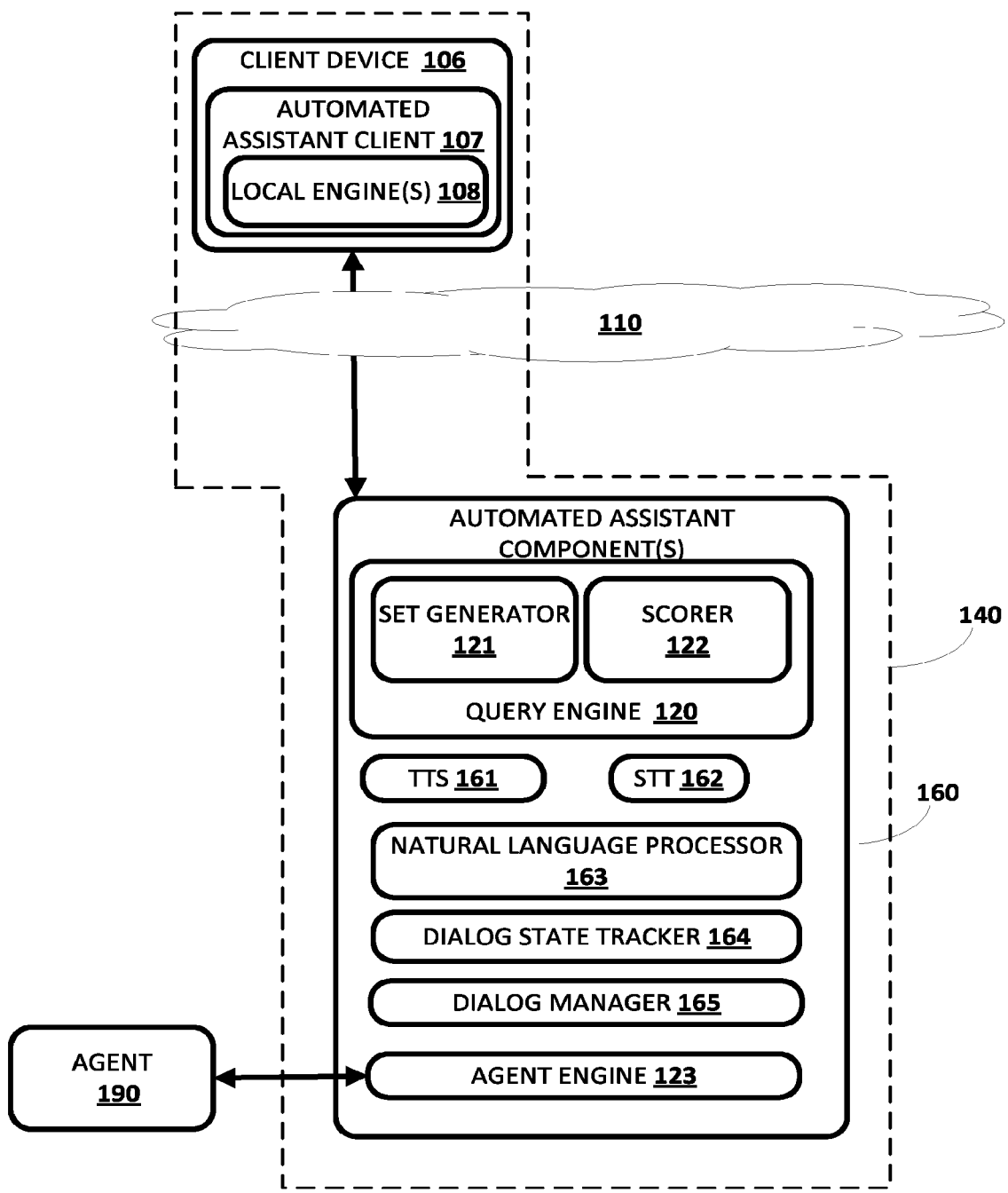
FIG. 4 is a block diagram of an example environment where responsive content can be generated in response to utterances that include compound queries.

Referring to FIG. 4, a block diagram is provided of an example environment where responsive content can be generated in response to utterances that include compound queries. The example environment includes a client computing device 106, which executes an instance of an automated assistant client 107. One or more cloud-based automated assistant components 160 can be implemented on one or more computing systems (collectively referred to as a "cloud" computing system) that are communicatively coupled to client device 106 via one or more local and/or wide area networks (e.g., the Internet) indicated generally at 110.

An instance of an automated assistant client 107, by way of its interactions with one or more cloud-based automated assistant components 160, may form what appears to be, from the user's perspective, a logical instance of an automated assistant 140 with which the user may engage in a human-to-computer dialog. It thus should be understood that in some implementations, a user that engages with an automated assistant client 107 executing on client device 106 may, in effect, engage with his or her own logical instance of an automated assistant 140. For the sakes of brevity and simplicity, the term "automated assistant" as used herein as "serving" a particular user will often refer to the combination of an automated assistant client 107 executing on a client device 106 operated by the user and one or more cloud-based automated assistant components 160 (which may be shared amongst multiple automated assistant clients of multiple client computing devices). It should also be understood that in some implementations, automated assistant 140 can respond to a request from any user regardless of whether the user is actually "served" by that particular instance of automated assistant 140.

The client computing device 106 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 106 can optionally operate one or more other applications that are in addition to automated assistant client 107, such as a message exchange client (e.g., SMS, MMS, online chat), a browser, and so forth. In some of those various implementations, one or more of the other applications can optionally interface (e.g., via an application programming interface) with the automated assistant 107, or include their own instance of an automated assistant application (that can also interface with the cloud-based automated assistant component(s) 160).

Automated assistant 140 engages in human-to-computer dialog sessions with a user via user interface input and output devices of the client device 106. To preserve user privacy and/or to conserve resources, in many situations a user must often explicitly invoke the automated assistant 140 before the automated assistant will fully process a spoken utterance. The explicit invocation of the automated assistant 140 can occur in response to certain user interface input received at the client device 106. For example, user interface inputs that can invoke the automated assistant 140 via the client device 106 can optionally include actuations of a hardware and/or virtual button of the client device 106. Moreover, the automated assistant client can include one or more local engines 108, such as an invocation engine that is operable to detect the presence of one or more spoken invocation phrases. The invocation engine can invoke the automated assistant 140 in response to detection of one of the spoken invocation phrases. For example, the invocation engine can invoke the automated assistant 140 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 106, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 140. As used herein, "invoking" the automated assistant 140 can include causing one or more previously inactive functions of the automated assistant 140 to be activated. For example, invoking the automated assistant 140 can include causing one or more local engines 108 and/or cloud-based automated assistant components 130 to further process audio data frames based on which the invocation phrase was detected, and/or one or more following audio data frames (whereas prior to invoking no further processing of audio data frames was occurring). For instance, local and/or cloud-based components can perform processing of an audio stream into text for generating a set of sub-queries in response to invocation of the automated assistant 140.

The one or more local engine(s) 108 of automated assistant 140 are optional, and can include, for example, the invocation engine described above, a local speech-to-text ("STT") engine (that converts single spoken utterances of a user to text), a local text-to-speech ("TTS") engine (that converts text to speech), a local natural language processor (that determines semantic meaning of audio and/or text converted from audio), and/or other local components. Because the client device 106 is relatively constrained in terms of computing resources (e.g., processor cycles, memory, battery, etc.), the local engines 108 may have limited functionality relative to any counterparts that are included in cloud-based automated assistant components 160.

Cloud-based automated assistant components 160 leverage the virtually limitless resources of the cloud to perform more robust and/or more accurate processing of audio data, and/or other user interface input, relative to any counterparts of the local engine(s) 108. Again, in various implementations, the client device 106 can provide audio data and/or other data to the cloud-based automated assistant components 160 in response to the invocation engine detecting a spoken invocation phrase, or detecting some other explicit invocation of the automated assistant 140.

The illustrated cloud-based automated assistant components 160 include a cloud-based TTS module 161, a cloud-based STT module 162, a natural language processor 163, a dialog state tracker 164, and a dialog manager 165. The illustrated cloud-based automated assistant components 160 also include the query engine 120 that generates a set of sub-queries from audio data received from the client device 106. Further, the cloud-based automated assistant components 160 include the agent engine 122 that can provide commands to one or more agents based on sub-queries of a generated set.

In some implementations, one or more of the engines and/or modules of automated assistant 140 may be omitted, combined, and/or implemented in a component that is separate from automated assistant 140. For example, in some implementations, the query engine 120 and/or the agent engine 123 may be implemented, in whole or in part, on the client device 106. Further, in some implementations automated assistant 140 can include additional and/or alternative engines and/or modules.

Cloud-based STT module 162 can convert audio data into text, which can then be provided to natural language processor 163. Text can include, for example, text 181 of FIG. 1 and can be based on a single spoken utterance of the user. In various implementations, the cloud-based STT module 162 can covert audio data into text based at least in part on indications of speaker labels and assignments that are provided by the assignment engine 124. Cloud-based TTS module 161 can convert textual data (e.g., natural language responses formulated by automated assistant 140 and/or one or more assistant agents 160) into computer-generated speech output. In some implementations, TTS module 161 can provide the computer-generated speech output to client device 106 to be output directly, e.g., using one or more speakers. In other implementations, textual data (e.g., natural language responses) generated by automated assistant 140 may be provided to one of the local engine(s) 108, which can then convert the textual data into computer-generated speech that is output locally.

Natural language processor 163 of automated assistant 140 processes free form natural language input and generates, based on the natural language input, annotated output for use by one or more other components of the automated assistant 140. For example, the natural language processor 163 can process natural language free-form input that is textual input that is a conversion, by STT module 162, of audio data provided by a user via client device 106. The generated annotated output can include one or more annotations of the natural language input and optionally one or more (e.g., all) of the terms of the natural language input.

In some implementations, the natural language processor 163 is configured to identify and annotate various types of grammatical information in natural language input. For example, the natural language processor 163 can include a part of speech tagger (not depicted) configured to annotate terms with their grammatical roles. Also, for example, in some implementations the natural language processor 163 can additionally and/or alternatively include a dependency parser (not depicted) configured to determine syntactic relationships between terms in natural language input.

In some implementations, the natural language processor 163 can additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 163 can annotate references to an entity at a high level of granularity (e.g., to enable identification of all references to an entity class such as people) and/or a lower level of granularity (e.g., to enable identification of all references to a particular entity such as a particular person). The entity tagger can rely on content of the natural language input to resolve a particular entity and/or can optionally communicate with a knowledge graph or other entity database to resolve a particular entity. Identified entities can be utilized to identify patterns in the text, as described herein.

In some implementations, the natural language processor 163 can additionally and/or alternatively include a coreference resolver (not depicted) configured to group, or "cluster," references to the same entity based on one or more contextual cues. For example, the coreference resolver can be utilized to resolve the term "there" to "Hypothetical Café" in the natural language input "I liked Hypothetical Café last time we ate there."

In some implementations, one or more components of the natural language processor 163 can rely on annotations from one or more other components of the natural language processor 163. For example, in some implementations the named entity tagger can rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 163 may use related prior input and/or other related data outside of the particular natural language input to determine one or more annotations.

In some implementations, dialog state tracker 164 can be configured to keep track of a "dialog state" that includes, for instance, a belief state of one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively can be tailored to individual slots and/or domains. For example, some techniques can require training a model for each slot type in each domain.

Dialog manager 165 can be configured to map a current dialog state, e.g., provided by dialog state tracker 164, to one or more "responsive actions" of a plurality of candidate responsive actions that are then performed by automated assistant 140. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 140 outputting additional natural language dialog. This responsive dialog can include, for instance, requests that the user provide parameters for some action (i.e., fill slots) that dialog state tracker 164 believes the user intends to perform. In some implementations, responsive actions can include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

The client device 106 submits a request via one or more local and/or wide area networks (e.g., the Internet) indicated generally at 110. The request can be a single spoken utterance of a user, as received via a microphone of client device 106. The single spoken utterance can be converted to text by STT module 162, processed by natural language processor 163 to identify parts of speech and/or entities in the text, and the text can be provided to query engine 120. Set generator 121 can generate a set of sub-queries based on the converted text and tagged terms and/or entities in the text, as previously described with respect to FIGS. 1 to 3. The set can be scored by scorer 122 and query engine 120 can provide the set of sub-queries to agent engine 123 is the resulting quality score satisfies a threshold. Agent engine 123 generates a command for each sub-query of the set and provides the commands to one or more agents 190, which then provide responsive content in response to receiving the commands. The responsive content can then be utilized to provide content to the user via client device 106. For example, responsive content can be converted to speech via the TTS module 161 and provided to the user as a dialog turn of a dialog by the dialog manager 165, as described herein.

Figure 5:
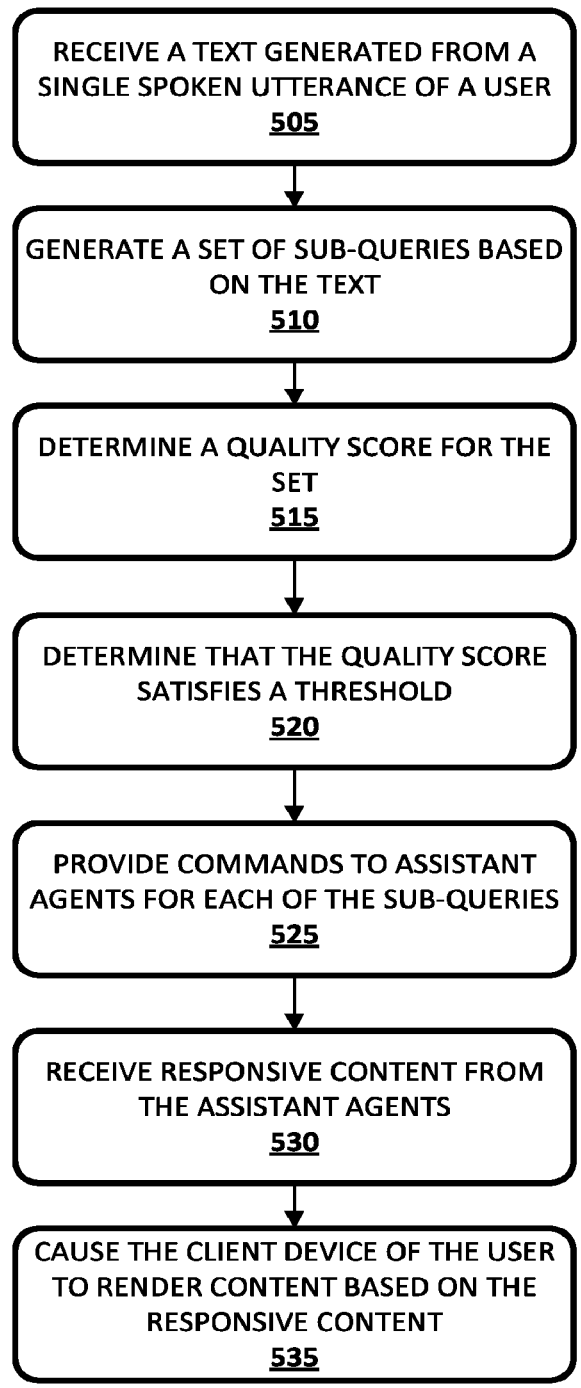
FIG. 5 illustrates a flowchart of an example method according to various implementations disclosed herein.

Referring to FIG. 5, a flowchart is illustrated of an example method according to various implementations described herein. For convenience, the operations of the flow chart of FIG. 5 are described with reference to a system that performs the operations. This system can include various components of various computer systems. Moreover, while operations of the method of FIG. 5 are shown in a particular order, this is not meant to be limiting. One or more operations can be reordered, omitted or added.

At block 505, the system receives text that is generated in response to a single spoken utterance of a user. The text can be based on a voice-text conversion performed by STT module 162 and further based on audio received from client device 106. For example, client device 106 can be executing an automated assistant client 107, which can provide the single spoken utterance to assistant 140. The text can be, in some instances, a compound query. For example, text of "What's the weather in Paris and show me restaurants near me" includes a request for the weather in Paris and also a request to be provided with restaurants near the user.

At block 510, the system generates a set of sub-queries based on the text received at block 505. The set can include any number of sub-queries that are based on the text and the set collectively defines a candidate interpretation of the text. Sub-queries can be generated based on any number of techniques, as described herein. For example, the sub-queries can be generated based on identifying patterns in the text, appending a prefix and/or suffix to text, contextual expansion of the text, and/or other methods for rewriting the text as a set of sub-queries that retain a similar meaning to the text. In some implementations, multiple sets can be generated for the text.

At block 515, system determines a quality score for the set of sub-queries. The quality score can be indicative of, for example, likelihood that the set correctly represents the intent of the separate queries that are included in the text. In some implementations, the quality score can be indicative of similarity between one or more recognized patterns and the sub-queries. For example, each of the sub-queries can be scored and a quality score for the set may be generated that is a function of the scores of the separate sub-queries. In instances when multiple sets can be generated for a text, a score may be determined for each of the sets.

At block 520, the system determines that the quality score, for the set, satisfies a threshold. Determining the quality score satisfies a threshold can include determining the quality score satisfies a threshold relative to the quality score(s) for other set(s) (thereby indicating the sub-queries of the given set are a more appropriate interpretation than the sub-queries of other sets); determining it satisfies a threshold relative to a compound query quality score that is optionally determined for the compound query without its splitting into sub-queries (thereby indicating splitting the compound query into sub-queries is more appropriate than not splitting the compound query); and/or determining it satisfies a fixed threshold (thereby indicating the sub-queries of the given set are a coherent interpretation).

At block 525, in response to determining that the quality score of the set satisfies a threshold, the system provides commands to one or more corresponding assistant agents. For each of the sub-queries, the system generates a corresponding command that is based on the corresponding sub-query, and provides the corresponding command to a corresponding assistant agent. For example, for a sub-query of "What's the weather in Paris," a structured command can be generated with an intent of "current weather" and a location value of "Paris", the command can be provided to an assistant agent. Commands can be generated and provided to assistant agents by a component that shares one or more characteristics with agent engine 123.

At block 530, the system receives responsive content from the assistant agent(s) in response to providing the agent(s) with the commands. The responsive content can be, for example, text, images, audio, video, and/or other content that may be rendered to the user and/or that can be utilized in rendering content to the user. For example, a command of "Paris" that is provided to a weather assistant agent may result in responsive content of "68, sunny," which can be provided as text, as audio, and/or as an image.

At block 535, the system utilizes responsive content from the assistant agents to cause the client device 106 of the user to render content based on the responsive content. Rendering content can include providing audio to the user that is based on the responsive content, providing responsive content as text, and/or providing the responsive content visually. In some implementations, the responsive content can be utilized to generate an aggregate command, which is provided to an assistant agent, with the responsive content from the additional agent being utilized to render content to the client device 106, as described herein.

Figure 6:
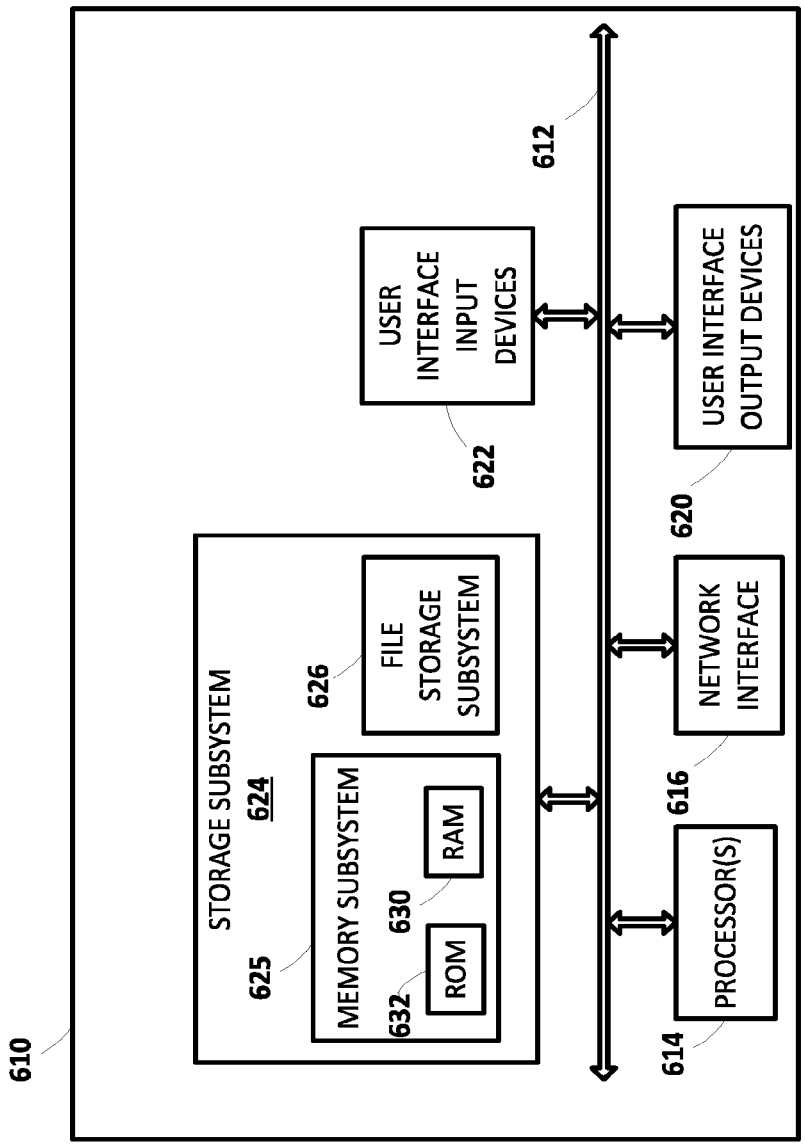
FIG. 6 illustrates an example architecture of a computing device.

FIG. 6 is a block diagram of an example computing device 610 that can optionally be utilized to perform one or more aspects of techniques described herein. For example, client device 106 can include one or more components of example computing device 610 and/or one or more server devices that implement cloud-based automated assistant components 110.

Computing device 610 typically includes at least one processor 614 which communicates with a number of peripheral devices via bus subsystem 612. These peripheral devices can include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 can include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 can include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 can include the logic to perform selected aspects of the example process flows of FIGS. 1-3, the method depicted in FIG. 5, and/or to implement various components depicted in FIGS. 1-5.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and can include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem can use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

What is claimed is:

1. A method implemented by one or more processors, the method comprising:
receiving text that is generated in response to detection of a single spoken utterance of a user at an assistant interface of a client device of the user, the text corresponding to the single spoken utterance and being generated based on a voice-to-text conversion of the single spoken utterance;

generating, based on the text, a set of sub-queries, the
 sub-queries of the set including at least a first sub-query
 and a second sub-query, wherein the sub-queries of the
 set collectively define one candidate interpretation of
 the text,
wherein generating the set of sub-queries includes:
 identifying aliases of one or more entities that are
  included in the text;
 identifying a pattern based on the text, wherein the
  pattern includes one or more terms and an entity
  type;
 generating a first portion based on the pattern;
 replacing the entity type in the first portion with a
  corresponding one of the aliases to generate the first
  sub-query;
 generating a second portion based on the pattern; and
 replacing the entity type in the second portion with a
  corresponding one of the aliases to generate the
  second sub-query;
determining a quality score for the set of sub-queries,
 wherein the quality score for the set is indicative of
 likelihood that the sub-queries of the set represent an
 intent of the text;
determining that the quality score for the set of sub-
 queries satisfies at least one threshold;
in response to determining that the quality score satisfies
 the threshold:
providing, for each of the sub-queries of the set, a
 corresponding command to a corresponding assistant
 agent, wherein providing the corresponding commands
 comprises providing at least:
a first command based on the first sub-query, and
a second command based on the second sub-query;
receiving, in response to providing the corresponding
 commands, corresponding responsive content, the cor-
 responding responsive content including at least first
 responsive content that is in response to the first
 command, and second responsive content that is in
 response to the second command; and
causing the client device to render content to the user that
 is based on the corresponding responsive content.

2. The method of claim 1, wherein causing the client device to render content to the user includes:
causing the client device to render first content based on the first responsive content; and
causing the client device to render second content based on the second responsive content.

3. The method of claim 1, further comprising:
performing at least one operation that includes, as input, at least a portion of the first responsive content and at least a portion of the second responsive content to generate a combined response; and
causing the client device to render content that is based on the combined response.

4. The method of claim 1, further comprising:
generating, based on the text, a second set of second sub-queries, wherein the second sub-queries of the second set are unique from the sub-queries of the set, and wherein the second sub-queries of the second set collectively define an additional candidate interpretation of the text; and
determining an additional quality score for the second set of second sub-queries,
wherein determining that the quality score for the set of sub-queries satisfies the threshold is based on comparison of the quality score, for the set, to the additional quality score, for the second set.

5. The method of claim 4, wherein generating the second set of sub-queries includes identifying a second pattern that is unique from the pattern.

6. The method of claim 1, wherein determining the quality score for the set includes:
determining a first quality score for the first sub-query;
determining a second quality score for the second sub-query; and
determining the quality score for the set as a function of the first quality score and the second quality score.

7. The method of claim 6, wherein determining the first quality score for the first sub-query comprises determining whether the first sub-query conforms to one or more recognized commands for any assistant agent, and wherein determining the second quality score for the second sub-query comprises determining whether the second sub-query conforms to one or more of the recognized commands for any assistant agent.

8. The method of claim 1, wherein the set includes at least three sub-queries.

9. The method of claim 1, further comprising:
determining a text quality score for the text, wherein determining that the quality score for the set of sub-queries satisfies the threshold is based on comparison of the quality score to the text quality score; and
in response to the quality score for the set of sub-queries satisfying the threshold:
generating the commands based on the set of sub-queries, in lieu of generating the commands based on the text.

10. A system, comprising:
memory and one or more processors, the memory storing instructions that, when executed by the one or more processors, cause the one or more processors to perform the following operations:
receiving text that is generated in response to detection of a single spoken utterance of a user at an assistant interface of a client device of the user, the text corresponding to the single spoken utterance and being generated based on a voice-to-text conversion of the single spoken utterance;
generating, based on the text, a set of sub-queries, the sub-queries of the set including at least a first sub-query and a second sub-query, wherein the sub-queries of the set collectively define one candidate interpretation of the text,
wherein generating the set of sub-queries includes:
 identifying aliases of one or more entities that are included in the text;
 identifying a pattern based on the text, wherein the pattern includes one or more terms and an entity type;
 generating a first portion based on the pattern;
 replacing the entity type in the first portion with a corresponding one of the aliases to generate the first sub-query;
 generating a second portion based on the pattern; and
 replacing the entity type in the second portion with a corresponding one of the aliases to generate the second sub-query;
determining a quality score for the set of sub-queries, wherein the quality score for the set is indicative of likelihood that the sub-queries of the set represent an intent of the text;
determining that the quality score for the set of sub-queries satisfies at least one threshold;
in response to determining that the quality score satisfies the threshold:

providing, for each of the sub-queries of the set, a corresponding command to a corresponding assistant agent, wherein providing the corresponding commands comprises providing at least:
a first command based on the first sub-query, and
a second command based on the second sub-query;
receiving, in response to providing the corresponding commands, corresponding responsive content, the corresponding responsive content including at least first responsive content that is in response to the first command, and second responsive content that is in response to the second command; and
causing the client device to render content to the user that is based on the corresponding responsive content.

11. The system of claim 10, wherein causing the client device to render content to the user includes:
causing the client device to render first content based on the first responsive content; and
causing the client device to render second content based on the second responsive content.

12. The system of claim 10, wherein the instructions further include instructions that, when executed by the one or more processors, further cause the one or more processors to perform the following operations:
performing at least one operation that includes, as input, at least a portion of the first responsive content and at least a portion of the second responsive content to generate a combined response; and
causing the client device to render content that is based on the combined response.

13. The system of claim 10, wherein the instructions further include instructions that, when executed by the one or more processors, further cause the one or more processors to perform the following operations:
generating, based on the text, a second set of second sub-queries, wherein the second sub-queries of the second set are unique from the sub-queries of the set, and wherein the second sub-queries of the second set collectively define an additional candidate interpretation of the text; and
determining an additional quality score for the second set of second sub-queries,
wherein determining that the quality score for the set of sub-queries satisfies the threshold is based on comparison of the quality score, for the set, to the additional quality score, for the second set.

14. The system of claim 13, wherein generating the second set of sub-queries includes identifying a second pattern that is unique from the pattern.

15. At least one non-transitory computer-readable medium comprising instructions that, in response to execution of the instructions by one or more processors, cause the one or more processors to perform the following operations:
receiving text that is generated in response to detection of a single spoken utterance of a user at an assistant interface of a client device of the user, the text corresponding to the single spoken utterance and being generated based on a voice-to-text conversion of the single spoken utterance;
generating, based on the text, a set of sub-queries, the sub-queries of the set including at least a first sub-query and a second sub-query, wherein the sub-queries of the set collectively define one candidate interpretation of the text,
wherein generating the set of sub-queries includes:
identifying aliases of one or more entities that are included in the text;
identifying a pattern based on the text, wherein the pattern includes one or more terms and an entity type;
generating a first portion based on the pattern;
replacing the entity type in the first portion with a corresponding one of the aliases to generate the first sub-query;
generating a second portion based on the pattern; and
replacing the entity type in the second portion with a corresponding one of the aliases to generate the second sub-query;
determining a quality score for the set of sub-queries, wherein the quality score for the set is indicative of likelihood that the sub-queries of the set represent an intent of the text;
determining that the quality score for the set of sub-queries satisfies at least one threshold;
in response to determining that the quality score satisfies the threshold:
providing, for each of the sub-queries of the set, a corresponding command to a corresponding assistant agent, wherein providing the corresponding commands comprises providing at least:
a first command based on the first sub-query, and
a second command based on the second sub-query;
receiving, in response to providing the corresponding commands, corresponding responsive content, the corresponding responsive content including at least first responsive content that is in response to the first command, and second responsive content that is in response to the second command; and
causing the client device to render content to the user that is based on the corresponding responsive content.

16. The at least one non-transitory computer-readable medium of claim 15, wherein causing the client device to render content to the user includes:
causing the client device to render first content based on the first responsive content; and
causing the client device to render second content based on the second responsive content.

17. The at least one non-transitory computer-readable medium of claim 15, wherein the instructions further include:
performing at least one operation that includes, as input, at least a portion of the first responsive content and at least a portion of the second responsive content to generate a combined response; and
causing the client device to render content that is based on the combined response.

18. The at least one non-transitory computer-readable medium of claim 15, wherein the instructions further include:
generating, based on the text, a second set of second sub-queries, wherein the second sub-queries of the second set are unique from the sub-queries of the set, and wherein the second sub-queries of the second set collectively define an additional candidate interpretation of the text; and
determining an additional quality score for the second set of second sub-queries,
wherein determining that the quality score for the set of sub-queries satisfies the threshold is based on comparison of the quality score, for the set, to the additional quality score, for the second set.

19. The at least one non-transitory computer-readable medium of claim 15, wherein generating the second set of sub-queries includes identifying a second pattern that is unique from the pattern.

20. The at least one non-transitory computer-readable medium of claim 15, wherein the set includes at least three sub-queries.

* * * * *